UNITED STATES PATENT OFFICE.

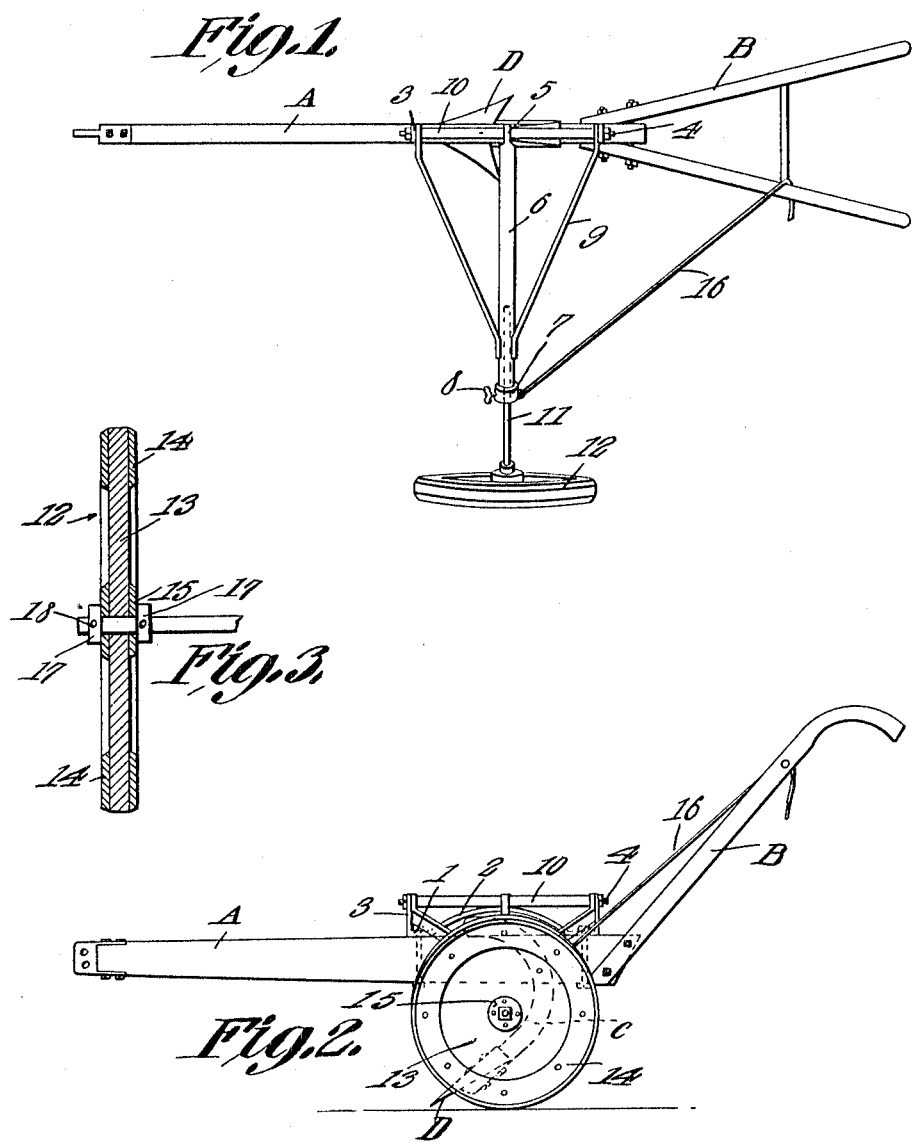

OSCAR B. COLEMAN, OF HARTSELLS, ALABAMA.

FURROW-GAGE.

1,106,028.  Specification of Letters Patent.  Patented Aug. 4, 1914.

Application filed May 22, 1914.   Serial No. 840,259.

*To all whom it may concern:*

Be it known that I, OSCAR B. COLEMAN, a citizen of the United States, residing at Hartsells, in the county of Morgan and State of Alabama, have invented a new and useful Furrow-Gage, of which the following is a specification.

This invention relates to a furrow gage, one of its objects being to provide a device of this character which can be applied readily to plows already in use and which, when placed so as to travel within a previously formed furrow, will constitute a gage whereby the plow can be readily guided to produce another furrow parallel with the one previously formed and at a predetermined distance therefrom.

Another object is to provide a gage of this character which can be easily adjusted to different distances between furrows and which can be readily shifted to position at one side or the other of the plow.

Another object is to provide a gage which is simple in construction, cheap to manufacture and which can be readily applied to a plow without requiring the services of a skilled mechanic.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a plow having the gage applied thereto. Fig. 2 is a side elevation of the structure shown in Fig. 1. Fig. 3 is an enlarged section through the wheel of the gage.

Referring to the figures by characters of reference A designates a plow beam having the usual handles B, standard C and plow share D. This plow can be of the usual or any preferred construction and the attachment constituting the present invention can be applied thereto readily without requiring the services of a skilled mechanic. This attachment includes a base plate 1 preferably formed with an intermediate arched portion 2 and with upstanding terminal ears 3. Extending through the ears is a pivot bolt 4 and mounted upon the middle portion of this bolt is the flattened inner end portion 5 of a tubular arm 6, the outer end of which is provided with an enlargement or collar 7 carrying a set screw 8. Braces 9 diverge inwardly from the outer end portion of the arm 6 and are mounted on the rod 4 between but close to the ears 3. Spacing sleeves 10 are mounted on the rod 4 between the inner end 5 of arm 6 and the ends of the braces 9.

Slidably mounted within the outer end portion of the tubular arm 6 is a rod 11 on the outer end of which a furrow wheel 12 is mounted to rotate. As shown in Fig. 3, this wheel is preferably formed of a flat disk 13 provided, upon its sides and at its periphery with reinforcing rings 14 of flat metal while at the center of each side of the disk 13 are arranged additional reinforcing rings 15. Thus it will be seen that the disk 13 can be made of wood and will be properly reinforced by the rings 14 and 15, the wheel being light but at the same time durable. A cord 16 may be connected to the collar 7 and fastened at one end to one of the handles B.

In using the attachment, the plate 1 is first bolted upon the beam A, as shown in Fig. 2 so that the wheel 12 can be brought to position at one side of the plow share D. The rod 11 is then adjusted longitudinally to bring the wheel 12 to a desired distance from the beam A.

After the first furrow has been formed, the plow is set so that the wheel 12 will rest within the furrow. By then guiding the plow forward so that the wheel 12 will travel within the furrow, the plow share D will produce another furrow parallel with and at a predetermined distance from the previously formed furrow. When the end of the furrow is reached and it is desired to return across the field and at the same time produce another furrow, the plow is reversed and the cord 16 is pulled so as to swing the arm 6 upwardly so that it will extend beyond the other side of the plow where the wheel 12 can rest in the previously formed furrow. The foregoing operation is then repeated.

By arching the intermediate portion of the strip 1, the ordinary transverse means employed for attaching the standard C to the beam A are bridged. Consequently, as before stated, the attachment can be applied to the beam without difficulty and by anyone.

Any suitable means can be provided for holding the wheel 12 against displacement relative to the rod 11. For example, a collar 17 can be mounted on the rod 11 at each side of the wheel, these collars being held in place by means of set screws 18 or the like.

What is claimed is:—

The combination with a plow, of a gage attachment including an arched base strip secured to the beam of the plow and having upstanding terminals, a pivot bolt supported by the terminals, an arm pivotally mounted on the bolt at the center thereof, braces diverging from the outer end of the arm and mounted upon the end portions of the bolt and between the terminals of the base strip, spacing devices upon the bolt and between the braces and the arm, a rod adjustably mounted within the arm, a furrow wheel journaled upon the rod, said wheel including a wooden disk, a reinforcing ring upon each side of the disk at the periphery thereof, and central reinforcing rings at the center of each side of the disk.

In testimony that I claim the foregoing as my own, I have hereto affixed my signature in the presence of two witnesses.

OSCAR B. COLEMAN.

Witnesses:
F. L. COLEMAN,
R. G. PATE.